July 9, 1963
J. L. FREE
3,097,104
APPARATUS FOR AND METHOD FOR APPLYING REFLECTIVE
COATINGS ON UNMASKED PORTION OF LAMP ENVELOPE
Filed Aug. 10, 1960
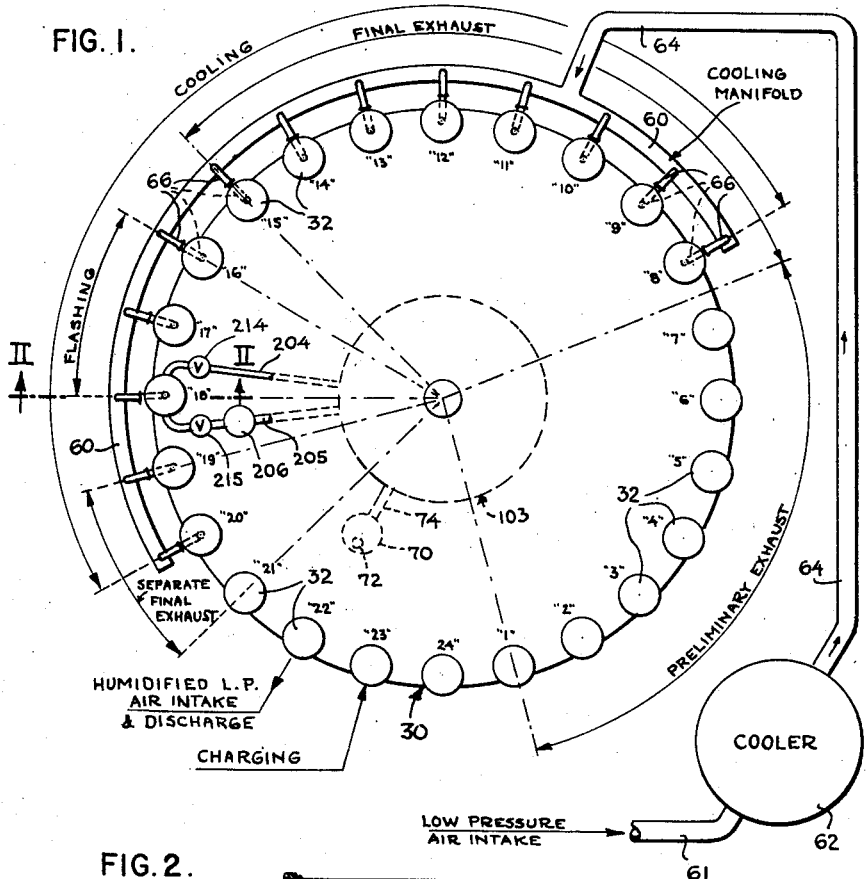
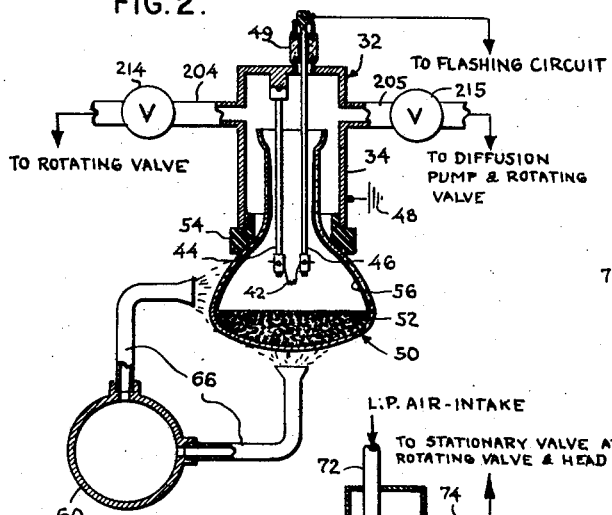
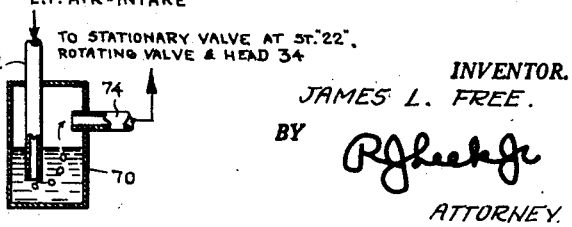
INVENTOR.
JAMES L. FREE.
BY
ATTORNEY.

United States Patent Office 3,097,104
Patented July 9, 1963

3,097,104
APPARATUS FOR AND METHOD FOR APPLYING REFLECTIVE COATINGS ON UNMASKED PORTION OF LAMP ENVELOPE
James L. Free, Little Rock, Ark., assignor to Westinghouse Electric Corporation, East Pittsburgh, Pa., a corporation of Pennsylvania
Filed Aug. 10, 1960, Ser. No. 48,690
8 Claims. (Cl. 117—38)

The present invention relates to the manufacture of reflected radiant-energy type lamps, such as sun, flood, spot and heat lamps, and more particularly, to an improved apparatus for and an improved method of applying reflective coatings to such lamps.

Heretofore, reflective coatings have been applied to the inner surfaces of such radiant-energy type lamps by coating apparatus of the type shown in U.S. Patent No. 2,569,852, issued October 2, 1951, to J. H. Green. In order to mask off the bowl end portion of the particular lamp and thus maintain such bowl end portion clear it is covered with a granular masking material, such as fine glass beads. An induced electrostatic charge (which develops between the glass beads and the glass envelope of the lamp during loading of the glass beads into the glass envelope) causes the glass beads to cling together in relatively large clusters, to move around in the lamp envelope and to become attached to the unmasked portions of such lamp envelope, so that when the reflective coating is vaporized onto the unmasked portion of the lamp envelope undesirable pin holes are produced in the reflective coating. The electrostatic charge is induced between the lamp envelope and the glass beads by frictional contact of the glass beads with the lamp envelope and the separation of the glass beads one from the other during the free fall of the glass beads into the lamp envelope. The electrostatic charge is enhanced when the humidity in the ambient atmosphere is low since the electrostatic charge between the glass envelope and glass beads is unable to leak off through the dry non-conducting atmosphere within the lamp envelope.

Another difficulty encountered in the reflective coating of such radiant-energy type lamps occurs at the discharge station of such coating machine. When the glass beads are removed from the coated but still heated lamp envelope, some of the glass beads occasionally stick to the plastic reflective coating on the lamp envelope before it sets with cooling. When the lamp envelope is agitated to remove the stuck glass beads, small flakes or portions of the reflective coating from the lamp envelope are removed therewith. Further, when the glass beads are dumped from the glass envelope such glass beads scratch the soft still plasticized reflective coating.

It is the general object of the present invention to avoid and overcome the foregoing, and other difficulties of and objections to prior art practices, by the provision of an improved apparatus for and method of applying reflective coatings to the envelopes of radiant-energy type lamps; which apparatus and method eliminate pin holes in the reflective coating and prevent removal of portions of the reflective coating during the discharge of the glass beads.

Another object of the present invention is to provide an improved method for leaking off the electrostatic charge between the lamp envelope and the granular masking material.

The aforesaid objects of the present invention, and other objects which will become apparent as the description proceeds, are achieved by providing the coating apparatus with cooling means which cool the lamp envelope during the exhausting and flashing operations. The improved method of coating comprises the steps of simultaneously cooling the lamp envelope during the sequential final exhausting of the lamp envelope, the coating of the lamp envelope and the further final exhausting of the coated lamp envelope.

For a better understanding of the present invention reference should be had to the accompanying drawing, wherein like numerals of reference indicate similar parts throughout the several views and wherein:

FIG. 1 is a diagrammatic plan view of the improved coating apparatus of the present invention.

FIG. 2 is a vertical-sectional view of a portion of the coating apparatus along the line II—II of FIG. 1 in the direction of the arrows.

FIG. 2 is a fragmentary side-elevational view of a bubbler disposed adjacent station "22" of the coating apparatus.

FIG. 4 is a side-elevational view of a finished radiant-energy type lamp with a portion of the lamp envelope broken away to show the details thereof.

Although the principles of the present invention are broadly applicable to radiant-energy type lamps, the present invention is particularly adapted for use in conjunction with heat lamps and hence it has been so illustrated and will be so described.

With specific reference to the form of the present invention illustrated in the drawing, and referring particularly to FIG. 1, the improved coating apparatus of the present invention is indicated generally by the reference numeral 30. As shown such coating apparatus 30 is provided with twenty-four heads 32, each comprising essentially, as shown in FIG. 2, an evacuating chamber 34 (FIG. 2). Since the entire exhaust system for each chamber 34 is fully disclosed in the above-mentioned U.S. Patent No. 2,569,852 it need be only briefly described herein with like reference numerals being employed for similar parts. To provide preliminary evacuation means for each chamber 34, a line 204 (shown in FIG. 1 adjacent station "18") connects each chamber 34 through a valve 214 to a rotary valve 103 which is suitably connected to an exhaust manifold (not shown). Each chamber 34 is also connected by a line 205 to a final exhaust system through a valve 215 and an oil diffusion pump 206 to the rotary valve 103 and thence to an exhaust manifold (not shown).

At station "23" (FIG. 1) one or more pieces of coating material, suitably aluminum or silver sheet or wire, are loaded into a flashing coil 42 mounted between electrodes 44 and 46 (FIG. 2). The electrode 44 depends from the top wall of the evacuating chamber 34 which is grounded at 48 while the other electrode 46 extends through such top wall and through a glass insulator 49 to a "flashing" circuit (not shown). Thereafter, the neck portion of a lamp envelope 50 containing granular masking material, such as glass beads 52, is inserted by hand or automatic means (not shown) through a soft rubber mouthpiece 54 on the lower portion of the evacuating chamber 34 to secure the bowl portion of such lamp envelope 50 in hermetic engagement with the evacuating chamber 34.

From station "1" through station "7" (FIG. 1) the lamp envelope 50 is connected by the valve 214 to the preliminary exhaust system. At stations "8" through "15" such lamp envelope 50 is finally evacuated by the final exhaust system, preparatory for the flashing operation at stations "16"–"18," where a reflective coating 56 (FIG. 3) is applied to the lamp envelope 50. To evacuate residual gaseous products of the flashing operation, the valve 215 again connects the now coated lamp envelope 50 to the final exhaust system at stations "19"–"21" to thereby provide an additional final exhaust.

According to the present invention, however, in order to provide a satisfactory reflective coating on the lamp envelope 50, such coating apparatus 30 is provided with a cooling means having a cooling manifold 60. This cooling means reduces the temperature of the lamp envelope 50 during exhausting, coating and further exhausting of such lamp envelope 50, to increase the relative humidity of the atmosphere within such lamp envelope and thereby provide an improved leakage path for the electrostatic charge between the lamp envelope 50 and the glass beads 52.

Cooling Means

This cooling manifold 60 extends peripherally around the coating apparatus 30 from station "8" through station "20." Low presure air at about 3 p.s.i. enters the "low pressure air intake" pipe 61 (FIG. 1), passes through a conventional cooler 62 where the air is cooled below prevailing ambient temperature (i.e. to a temperature of about 15–25° C.) and such cooled air is carried by a conduit 64 to the cooling manifold 60. Risers 66 extending from the cooling manifold 60 adjacent the heads 32 at such stations "8"–"20" uniformly circulate the cooled air around the lamp envelope 50 during the final exhausting of the lamp envelope 50 (stations "8"–"15"), during the coating of the lamp envelope 50 (stations "16"–"18") and during a portion of the separate final exhaust of the coated lamp envelope 50 (stations "19"–"20").

It will be understood by those skilled in the art that the uniform air cooling of the lamp envelope 50 from stations "8"–"15" increases the relative humidity of the residual atmosphere (being evacuated at station "8"–"15") and within such lamp envelope 50. As a result of this increased relative humidity of such residual atmosphere, a more conductive atmosphere is provided within such lamp envelope 50 thus enhancing the leakage of the electrostatic charge (between the lamp envelope 50 and glass beads 52) through the electrodes 44, 46 and evacuating chamber 34 to ground at 48.

Uniform application of the jets of cooling air at the flashing stations "16"–"18" also expedites the solidification of the applied vaporized reflective coating 56 on the cooled unmasked portions of the lamp envelope 50. Continued uniform air cooling of the lamp envelope adjacent stations "19" and "20" further aids the cooling and solidification of such reflective coating 56.

At station "22" the final exhaust system is again disconnected from the head 32 by operation of the rotary valve 103 and the now open valve 214 then allows a pneumatic means to pass a low pressure gas, such as air saturated with water vapor, into the evacuating chamber 34 and the now coated and cooled lamp envelope 50 to destrop the vacuum within the evacuating chamber 34 and to permit the removal of the lamp envelope 50 from the evacuating chamber 34. This water-vapor-saturated air also provides a conductive leakage path for any minute residual electrostatic charge (between the now coated lamp envelope 50 and glass beads 52) along electrodes 44 and 46 and evacuating chamber 34 to ground at 48.

Pneumatic Means

To saturate a source of low pressure air with water vapor, low pressure air enters a bubbler 70 (FIGS. 1 and 3) by means of a "low-pressure air intake" pipe 72. The water-vapor saturated low pressure air is conducted from the bubbler 70 by a line 74 (FIGS. 1 and 3) through the rotary valve 103 to the evacuating chamber 34 and the now coated envelope 50.

The glass beads 52 are then dumped from the coated lamp envelope 50. Since the electrostatic charge between the glass envelope 50 and the glass beads 52 has been eliminated, such glass beads do not stick to the recently applied reflective coating 56 during the dumping operation. In addition, the cooled solidified reflective coating 56 is not scratched by the glass beads 52 during their removal from the lamp envelope 50.

Thereafter, in the conventional manner, a lamp mount 76 (FIG. 4) is sealed to the now coated lamp envelope 50; such sealed lamp is then evacuated and tipped-off; and a base 78 is affixed about the seal portion of the lamp to provide the finished heat lamp shown in FIG. 4.

It will be recognized by those skilled in the art that the objects of the present invention have been achieved by providing an improved cooling apparatus having cooling means which is operable to provide a more conductive atmosphere within the lamp envelope being coated and thus provide an improved leakage path for the induced electrostatic charge between the lamp envelope and the glass beads. In addition such cooling means reduces the temperature of the coated lamp envelope to enhance the solidification and hardening of the latter thereby preventing scratching of such coated surface and adherence of the glass beads to the coated surface during the removal of the glass beads therefrom. The improved method of providing a reflective coating on the lamp envelope insures a more conductive atmosphere within such lamp envelope, thus substantially removing the electrostatic charge between the newly coated envelope and the glass beads and providing a uniform reflective coating without pin holes therein.

It will be appreciated by those skilled in the art that the above-mentioned improved method of providing a lamp envelope with a reflective coating may be performed by hand or by apparatus (other than the automatic coating apparatus herein disclosed) such as a stationary head 32 and hand operated tooling.

While in accordance with the patent statutes a preferred embodiment of the present invention has been illustrated and described in detail, it is to be particularly understood that the invention is not limited thereto or thereby.

I claim:

1. The method of applying a uniform reflective coating on an unmasked portion of a lamp envelope containing a predetermined quantity of granular material as a masking medium and between which an undesired electrostatic charge accumulates, said method comprising the steps of exhausting said lamp envelope, coating said unmasked portion of the evacuated lamp envelope with said reflective coating, simultaneously cooling said coated lamp envelope to increase the relative humidity of the atmosphere within said lamp envelope and provide an improved leakage path for said electrostatic charge, and thereafter introducing a gas saturated with water vapor into said coated lamp envelope to destroy the vacuum within said coated lamp envelope and provide a leakage path for any minute residual electrostatic charge between said coated lamp envelope and said glass beads.

2. The method of applying a uniform reflective coating on an unmasked portion of a lamp envelope containing a predetermined quantity of glass beads as a masking medium and between which an undesired electrostatic charge accumulates, said method comprising the steps of exhausting said lamp envelope, coating said unmasked portion of the evacuated lamp envelope with said reflective coating, re-exhausting the coated lamp envelope, simultaneously cooling said coated lamp envelope during re-exhausting thereof to increase the relative humidity of the atmosphere within said lamp and provide an improved leakage path for said electrostatic charge, and thereafter introducing a gas saturated with water vapor into said coated lamp envelope to destroy the vacuum within said coated lamp envelope and provide a leakage path for any minute residual electrostatic charge between said coated lamp envelope and said glass beads.

3. The method of providing a leakage path for an electrostatic charge between a lamp envelope and granular masking material during the application of a reflective coating to said lamp envelope, said method comprising the step of introducing a gas saturated with water vapor into said coated lamp envelope to destroy the vacuum within said coated lamp envelope and provide a leakage path for any minute residual electrostatic charge between said coated lamp envelope and said glass beads.

4. The method of providing a leakage path for an electrostatic charge between a lamp envelope and granular masking material contained therein during the application of a reflective coating to said lamp envelope, said method comprising the steps of cooling said lamp envelope to increase the relative humidity of the atmosphere within said lamp envelope and provide an improved leakage path for said electrostatic charge, and introducing a gas saturated with water vapor into said coated lamp envelope to provide a leakage path for any minute residual electrostatic charge between said coated lamp envelope and said glass beads.

5. Apparatus for applying a uniform reflective coating to an unmasked portion of a lamp envelope containing a predetermined quantity of granular masking material and between which an undesired electrostatic charge accumulates, said apparatus comprising envelope supporting means, coating means carried by said envelope supporting means in operative relation to said lamp envelope, means connected to said envelope supporting means for moving the latter through a plurality of work stations, an exhausting means at one group of work stations and connectable to said envelope supporting means and said lamp envelope for evacuating said lamp envelope, means at a second group of work stations for energizing said coating means and thereby providing said lamp envelope with a reflective coating, and cooling means disposed adjacent the above-mentioned work stations and operable to cool said lamp envelope thus increasing the relative humidity of the atmosphere within said lamp envelope and also providing an improved leakage path for said electrostatic charge.

6. Apparatus for applying a uniform reflective coating to an unmasked portion of a lamp envelope containing a predetermined quantity of granular masking material and between which an undesired electrostatic charge accumulates, said apparatus comprising envelope supporting means, coating means carried by said envelope supporting means in operative relation to said lamp envelope, means connected to said envelope supporting means for moving the latter through a plurality of work stations, an exhausting means at one group of work stations and connectable to said envelope supporting means and said lamp envelope for evacuating said lamp envelope, means at a second group of work stations for energizing said coating means and thereby providing said lamp envelope with a reflective coating, and pneumatic means at yet another work station and connectable to said envelope supporting means, said pneumatic means being operable to introduce a gas saturated with water vapor into said envelope supporting means and said coated lamp envelope thus destroying the vacuum therein and also providing a leakage path for any minute residual electrostatic charge between coated lamp envelope and said granular masking material.

7. Apparatus for applying a uniform reflective coating to an unmasked portion of a lamp envelope containing a predetermined quantity of granular masking material and between which an undesired electrostatic charge accumulates, said apparatus comprising envelope supporting means, coating means carried by said envelope supporting means in operative relation to said lamp envelope, means connected to said envelope supporting means for moving the latter through a plurality of work stations, a first exhausting means at one group of work stations and connectable to said envelope supporting means and said lamp envelope for evacuating said lamp envelope, means at a second group of work stations for energizing said coating means and thereby providing said lamp envelope with a reflective coating, cooling means disposed adjacent the above-mentioned work stations and operable to cool said lamp envelope thus increasing the relative humidity of the atmosphere within said lamp envelope and also providing an improved leakage path for said electrostatic charge, and pneumatic means at yet another work station and connectable to said envelope supporting means, said pneumatic means being operable to introduce a gas saturated with water vapor into said envelope supporting means and said coated lamp envelope thus destroying the vacuum therein and also providing a leakage path for any minute residual electrostatic charge between said coated lamp envelope and said granular masking material.

8. Apparatus for applying a uniform reflective coating to an unmasked portion of a lamp envelope containing a predetermined quantity of granular masking material and between which an undesired electrostatic charge accumulates, said apparatus comprising envelope supporting means, coating means carried by said envelope supporting means in operative relation to said lamp envelope, means connected to said envelope supporting means for moving the latter through a plurality of work stations, a first exhausting means at one group of work stations and connectable to said envelope supporting means and said lamp envelope for evacuating said lamp envelope, means at a second group of work stations for energizing said coating means and thereby providing said lamp envelope with a reflective coating, a second exhausting means at a third group of work stations and connectable to said envelope supporting means and the coated lamp envelope for further evacuating said coated lamp envelope, cooling means disposed adjacent the above-mentioned work stations and operable to cool said lamp envelope thus increasing the relative humidity of the atmosphere within said lamp envelope and also providing an improved leakage path for said electrostatic charge, and pneumatic means at yet another work station and connectable to said envelope supporting means, said pneumatic means being operable to introduce a gas saturated with water vapor into said envelope supporting means and said coated lamp envelope thus destroying the vacuum therein and also providing a leakage path for any minute residual electrostatic charge between said coated lamp envelope and said granular masking material.

References Cited in the file of this patent

UNITED STATES PATENTS

| 2,346,483 | Goss | Apr. 11, 1944 |
| 2,569,852 | Green | Oct. 2, 1951 |
| 2,826,166 | Davis | Mar. 11, 1958 |

FOREIGN PATENTS

| 685,785 | Germany | Dec. 23, 1939 |